United States Patent [19]
Atsushi et al.

[11] Patent Number: 5,479,310
[45] Date of Patent: Dec. 26, 1995

[54] THIN FILM MAGNETIC HEAD HAVING A VARIABLE THICKNESS MAGNETIC LAYER

[75] Inventors: Toyoda Atsushi; Sawada Shuichi, both of Hamamatsu, Japan

[73] Assignee: Yamaha Corporation, Hamamatsu, Japan

[21] Appl. No.: 375,127

[22] Filed: Jan. 17, 1995

Related U.S. Application Data

[63] Continuation of Ser. No. 129,804, Sep. 30, 1993, abandoned, which is a continuation of Ser. No. 817,066, Jan. 6, 1992, abandoned.

[30] Foreign Application Priority Data

Mar. 20, 1991 [JP] Japan .................................. 3-081458
Mar. 26, 1991 [JP] Japan .................................. 3-087491

[51] Int. Cl.⁶ ........................ G11B 5/187; G11B 5/245
[52] U.S. Cl. .................................. 360/126; 360/119
[58] Field of Search .................................. 360/126, 119

[56] References Cited

U.S. PATENT DOCUMENTS

| 4,710,838 | 12/1987 | Jahnke | 360/119 |
| 5,137,750 | 8/1992 | Amin et al. | 360/119 |

FOREIGN PATENT DOCUMENTS

| 53-83869 | 1/1980 | Japan | 360/126 |
| 64-43806 | 2/1989 | Japan | |

*Primary Examiner*—Robert S. Tupper
*Attorney, Agent, or Firm*—Loeb & Loeb

[57] ABSTRACT

A thin film magnetic head includes a projecting portion formed on a surface opposite to a magnetic gap layer of at least one of pole portions of upper and lower magnetic layers. The projecting portion extends inwardly from the foremost exposed end surface of the pole portion and has a shape such that the edge of the foremost exposed end surface opposite to the magnetic gap layer of the pole portion is offset from a line normal to the direction of relative movement of the magnetic head with respect to a magnetic medium. The edge is thereby provided with a certain width in the direction of the relative movement with respect to the magnetizing inverting portion, so that the entire edge does not pass over the magnetizing inverting portion all at once but passes over it one portion of the edge after another. An undershoot occurring in a reproduced signal is thereby flattened with a reduced peak portion and reproduction characteristics are therefore improved and occurrence of a reading error can be prevented. In one aspect of the invention, a reduced thickness portion is formed in at least one of the upper and lower magnetic layers in the vicinity of a throat height zero position. Magnetic saturation occurs in only the reduced thickness portion and a proper magnetic saturation in the pole can thereby be achieved.

23 Claims, 16 Drawing Sheets

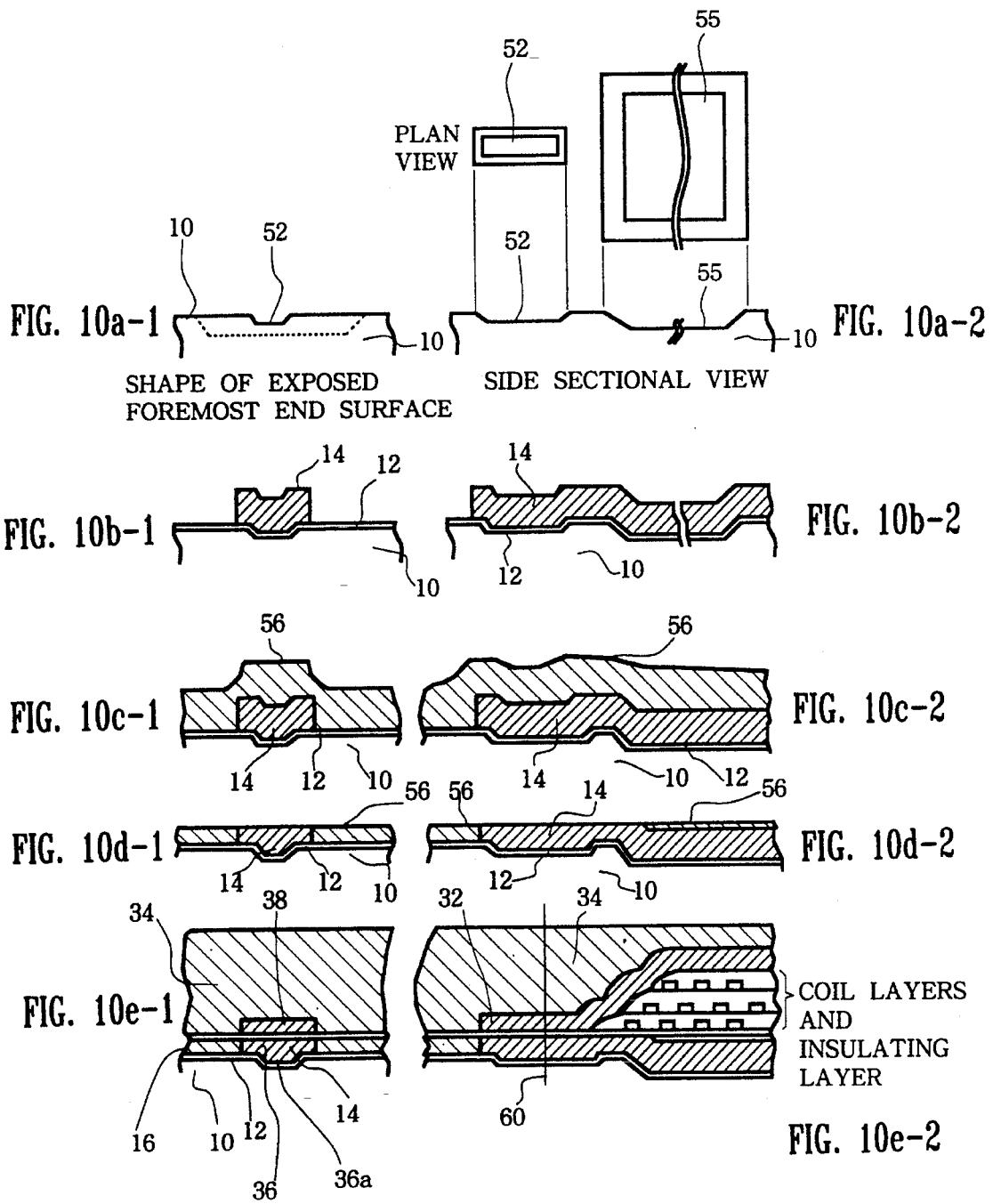

WRITE CURRENT LARGE

WRITE CURRENT MEDIUM

WRITE CURRENT SMALL

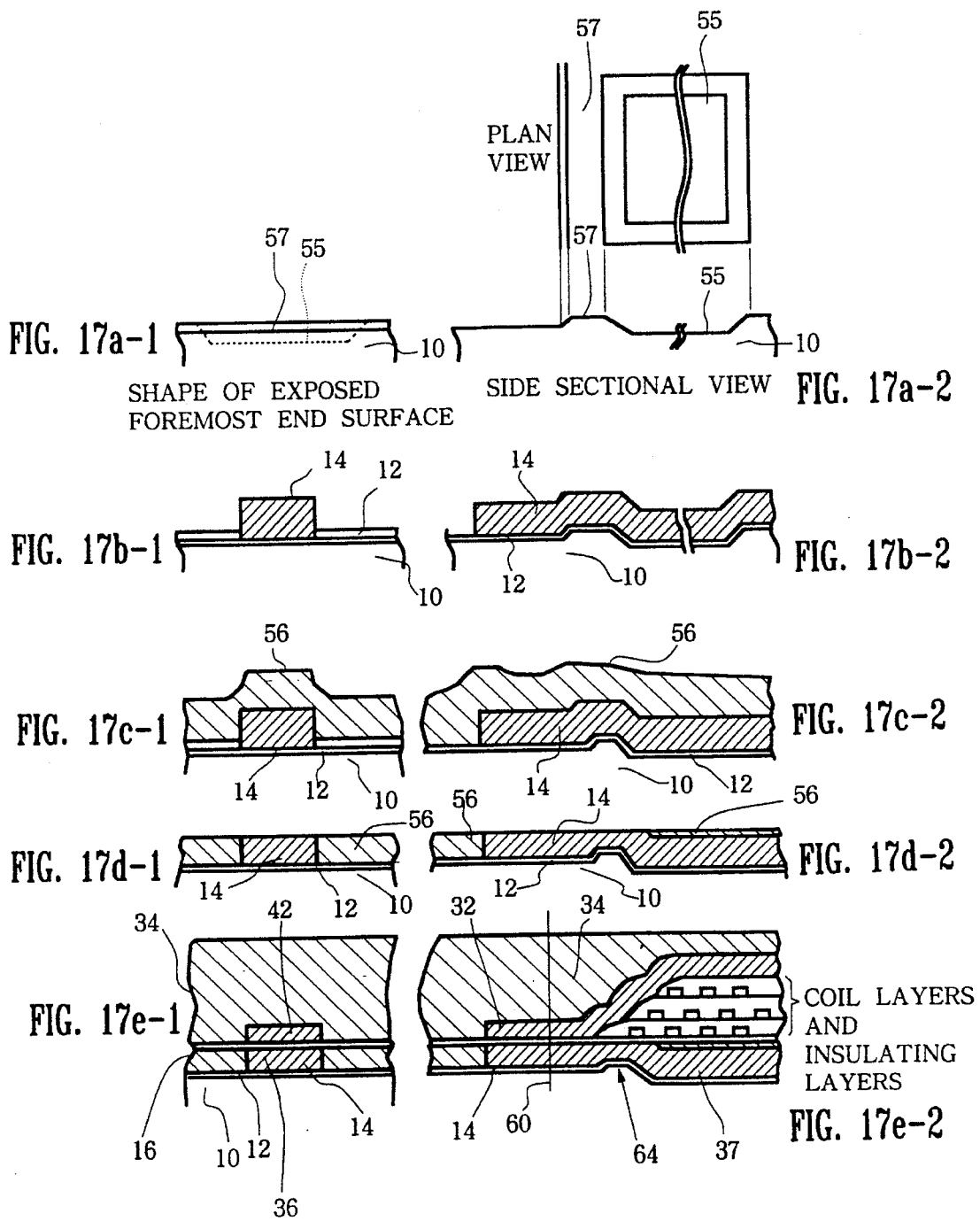

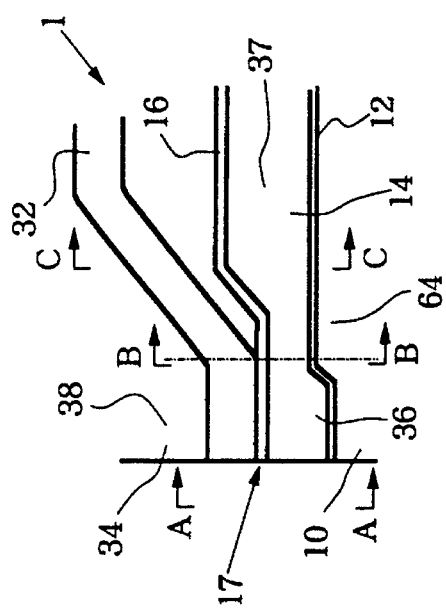
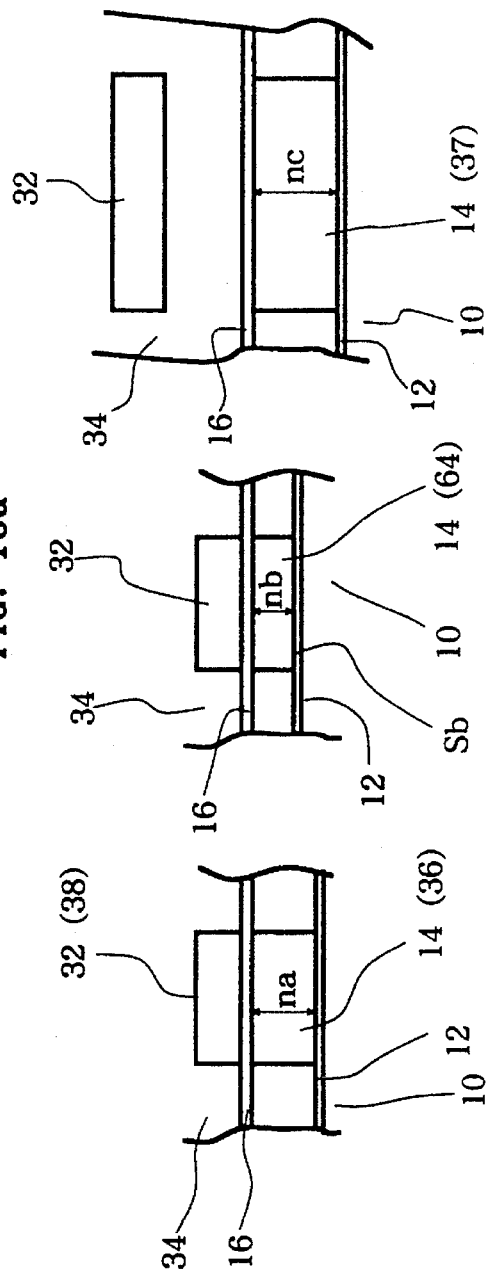
FIG. 18a
FIG. 18b
FIG. 18c
FIG. 18d

THIN FILM MAGNETIC HEAD HAVING A VARIABLE THICKNESS MAGNETIC LAYER

This is a continuation of application Ser. No. 08/129,804, filed Sep. 30, 1993, now abandoned.

This is a continuation of application Ser. No. 07/817,066, filed Jan. 6, 1992, now abandoned.

BACKGROUND OF THE INVENTION

This invention relates to a thin film magnetic head and, more particularly, to a thin film magnetic head with improved recording and reproduction characteristics.

A thin film magnetic head is used as recording and reproducing means in a magnetic disk device. A prior art magnetic head used for a magnetic disk device is illustrated in FIGS. 2a, 2b and 2c. FIG. 2a is a front view, FIG. 2b is a view taken along arrows A—A in FIG. 2a and FIG. 2c is a view taken along arrows B—B in FIG. 2a. In this prior art magnetic head, the conducting coil is made in three layers.

This thin film magnetic head 1 includes a clean, mirror-surface slider substrate 10 which is made of, e.g., an $Al_2O_3$—TiC system ceramic plate. On this substrate 10 is deposited, by the sputtering method, a undercoat layer 12 of $SiO_2$, $Al_2O_3$ or the like of 10 and several μm thickness. A lower magnetic layer 14 is provided on the undercoat layer 12 by electroplating, for example, A magnetic gap layer 16 is deposited by sputtering on the lower magnetic layer 14 to form a magnetic gap 17. The magnetic gap layer 16 is made, for example, of $SiO_2$, $Al_2O_3$ or the like as the protective layer 12.

A first insulating layer 18 is provided on the magnetic gap layer 16. A positive type photoresist is normally used as the insulating layer which is cured to a stable state by heating. On the first insulating layer 18 is formed a first coil layer 20 of a thickness of several μm by copper electroplating. On the first coil layer 20 are sequentially formed, by the same methods, a second insulating layer 22, a second coil layer 24, a third insulating layer 26, a third coil layer 28 and a fourth insulating layer 30.

On the fourth insulating layer 30 is formed an upper magnetic layer 32 by electroplating. The rear portion of the upper magnetic layer 32 opposite to a pole portion is in contact with the lower magnetic layer 14. A protective layer 34 of $SiO_2$, $Al_2O_3$ or the like is deposited by sputtering on the upper magnetic layer 32 to cover the entire upper magnetic layer 32.

In the prior art thin film magnetic head, the exposed foremost end surface of the pole portion (leading pole 36 and trailing pole 38) of the upper and lower magnetic layers 14 and 32 is, as shown in FIG. 2c, formed on a normal line with respect to the direction of relative movement of a recording medium. This edge shape, however, causes a distortion called undershoot in a magnetizing inverting portion of a reproduced signal as shown in FIG. 3 and this undershoot causes a reading error.

It is, therefore, a first object of the invention to overcome this problem and provide a thin film magnetic head with reduced undershoot and improved reproduction characteristics.

In the prior art thin film magnetic head 1, there is also the problem that its recording characteristics are adversely affected by magnetic saturation of the pole portion. The state of magnetic saturation of the pole portion in the thin film magnetic head 1 in relation to the magnitude of write current is shown in FIGS. 15a, 15b and 15c and described in Table 1.

TABLE 1

|  | FIG. 15a | FIG. 15b | FIG. 15c |
| --- | --- | --- | --- |
| write current | small | medium | large |
| magnetic saturation of pole | none | immediately before saturation | significant saturation |
| write magnetic field | too weak to write | strong and sharp magnetic field produced | strong magnetic field produced in broad range |
| density of recording | — | high | low |

In the prior art thin film magnetic head 1, the phenomena shown in FIGS. 15a and 15c are produced unless the write current is properly adjusted. It is however extremely difficult to manufacture a magnetic head which can obtain a proper magnetic field as shown in FIG. 15b and it is also difficult to adjust a throat height (FIG. 2a) for this purpose with the result that production efficiency of the magnetic head is held at a low level.

It is therefore a second object of the invention to provide a thin film magnetic head with improved recording characteristics.

SUMMARY OF THE INVENTION

A thin film magnetic head achieving the first object of the invention comprises a lower magnetic layer having a pole portion, an upper magnetic layer having a pole portion, a magnetic gap layer forming a magnetic gap between the upper magnetic layer and the lower magnetic layer, one or more conduction coils provided between the magnetic gap layer and the upper magnetic layer, one or more non-magnetic insulating layers provided between the magnetic gap layer and the upper magnetic layer for protecting the conduction coil or coils, a projecting portion formed on a surface opposite to the magnetic gap layer of at least one of the pole portions of the upper and lower magnetic layers, said projecting portion extending inwardly from the foremost exposed end surface of the pole portion and having a shape such that the edge of the foremost exposed end surface opposite to the magnetic gap layer of the pole portion is offset from a line normal to the direction of relative movement of the magnetic head with respect to a magnetic medium.

According to the invention, the edge of the foremost exposed end surface of the projecting portion is offset from the line normal to the direction of relative movement of the magnetic head with respect to the magnetic medium and, therefore, the edge is provided with a certain width in the direction of the relative movement with respect to the magnetizing inverting portion of the magnetic medium, so that the entire edge does not pass over the magnetizing inverting portion all at once but passes over it one portion of the edge after another. An undershoot occurring in a reproduced signal is thereby flattened with a reduced peak portion and, as a result, reproduction characteristics are improved and occurrence of a reading error can be prevented.

Moreover, the provision of the projecting portion enables the pole portion of the magnetic layer to have a sufficient thickness (if the pole portion is not sufficiently thick, reluctance during reproduction increases resulting in decrease in the reproduced output).

A thin film magnetic head achieving the second object of the invention comprises a lower magnetic layer having a pole portion, an upper magnetic layer having a pole portion, a magnetic gap layer forming a magnetic gap between the upper magnetic layer and the lower magnetic layer, one or more conduction coils provided between the magnetic gap layer and the upper magnetic layer, one or more non-magnetic insulating layers provided between the magnetic gap layer and the upper magnetic layer for protecting the conduction coil or coils, a reduced thickness portion formed in at least one of the upper magnetic layer and the lower magnetic layer in the vicinity of a throat height zero position, said reduced thickness portion having a thickness which is smaller than thickness of a pole portion of the lower magnetic layer and thickness of a portion having the largest thickness in the lower magnetic layer.

According to this aspect of the invention, since the provision of the reduced thickness portion having a thickness which is smaller than the thickness of the pole portion of the lower magnetic layer and the thickness of the portion of the lower magnetic layer having the largest thickness, when the write current increases, magnetic saturation occurs in only the reduced thickness portion, so that the total amount of flux produced in the foremost end portion of the pole portion is restricted and, therefore, flux which is sufficient for saturating the foremost end portion of the pole portion is not produced. Accordingly, even when the write current is increased, a sharp and strong write magnetic field is produced in the magnetic gap whereby writing density can be increased and desired recording characteristics can be obtained without requiring highly accurate adjustments of the manufacturing process and throat height. Thus, efficiency of production of magnetic heads is improved.

Preferred embodiments of the invention will be described with reference to the accompanying drawings.

BRIEF DESCRIPTION OF THE DRAWINGS

In the accompanying drawing,

FIGS. 1a, 1b and 1c are diagrams showing an embodiment of the invention in which FIG. 1a is a sectional view, FIG. 1b is an enlarged view of the portion A in FIG. 1a and FIG. 1c is a view taken along arrows B—B in FIG. 1b;

FIGS. 2a, 2b and 2c are diagrams showing a prior art thin film magnetic head in which FIG. 2a is a front view, FIG. 2b is a view taken along arrows A—A in FIG. 2a; and FIG. 2c is a view taken along arrows B—B in FIG. 2a;

FIGS. 10a–l to 10e–z showing an example of a process of manufacturing the thin film magnetic head of FIG. 1;

FIGS. 12a–l, 12a–z to 12c–z are diagrams showing other embodiments of the invention;

FIGS. 14a, 14b and 14c are views showing another embodiment of the invention in which FIG. 14a is a sectional view, FIG. 14b is an enlarged view of the portion A in FIG. 14a and FIG. 14c is a plan view of the lower magnetic layer 14;

FIGS. 17a–l, to 17c–z showing an example of a process of manufacturing the thin film magnetic head of FIG. 14; and FIGS. 18a, 18b, 18c and 18d are diagrams showing other embodiments of the invention.

DESCRIPTION OF PREFERRED EMBODIMENTS

Figure 1A:
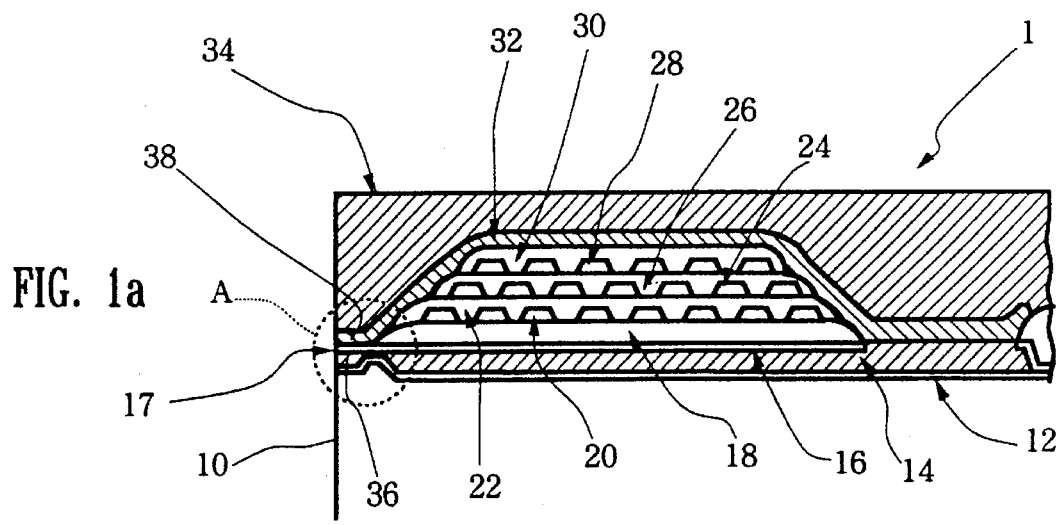
Figure 4:
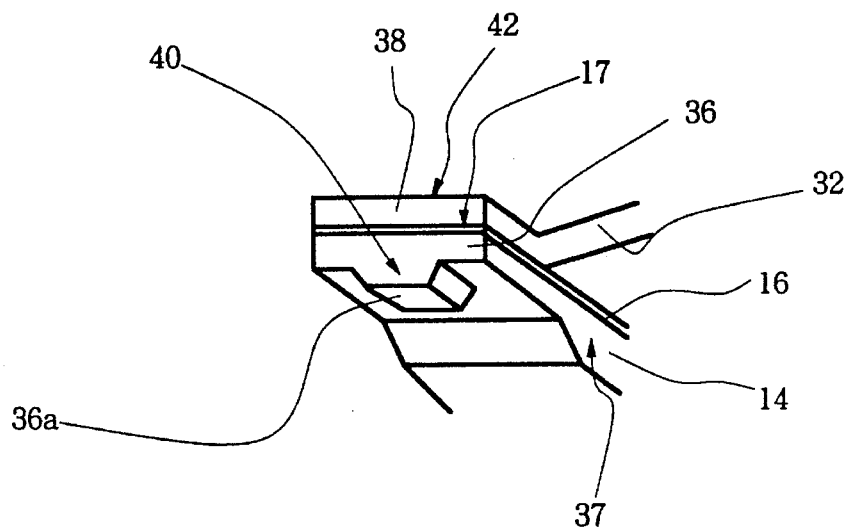
FIG. 4 is a perspective view of the thin film magnetic head of FIG. 1.

An embodiment of the invention is shown in FIG. 1a and its perspective view is shown in FIG. 4. In this embodiment, the invention is applied to the leading edge. The same component parts as those of the prior art magnetic head shown in FIG. 2 are designated by the same reference characters.

This thin film magnetic head 1 includes a clean, mirror-surface slider substrate 10 made of, e.g., $Al_2O_3$—Ti system ceramic plate. A protective layer 12 such as $SiO_2$ or $Al_2O_3$ is formed by sputtering in the thickness of ten and several μm. A lower magnetic layer 14 is provided thereon by electroplating. A magnetic gap layer 16 is provided by sputtering on the lower magnetic layer 14 to form a magnetic gap 17. The magnetic layer 16 is made of, e.g., $SiO_2$, $Al_2O_3$ or the like as the protective layer 12.

A first insulating layer 18 is provided on the magnetic gap layer 16. A positive type photoresist is normally used as the insulating layer which is cured to a stable state by heating. A first coil layer 20 is formed by copper electroplating in the thickness of several μm on the first insulating layer 18. On the first coil layer 20 are further provided a second insulating layer 22, a second coil layer 24, a third insulating layer 26, a third coil layer 28 and a fourth insulating layer 30 in the same manner.

An upper magnetic layer 32 is formed by electroplating on the fourth insulating layer 30. A protective layer 34 of $SiO_2$, $Al_2O_3$ or the like is provided on the upper magnetic layer 32 by sputtering to cover the entire upper magnetic layer 32.

Figure 1B:
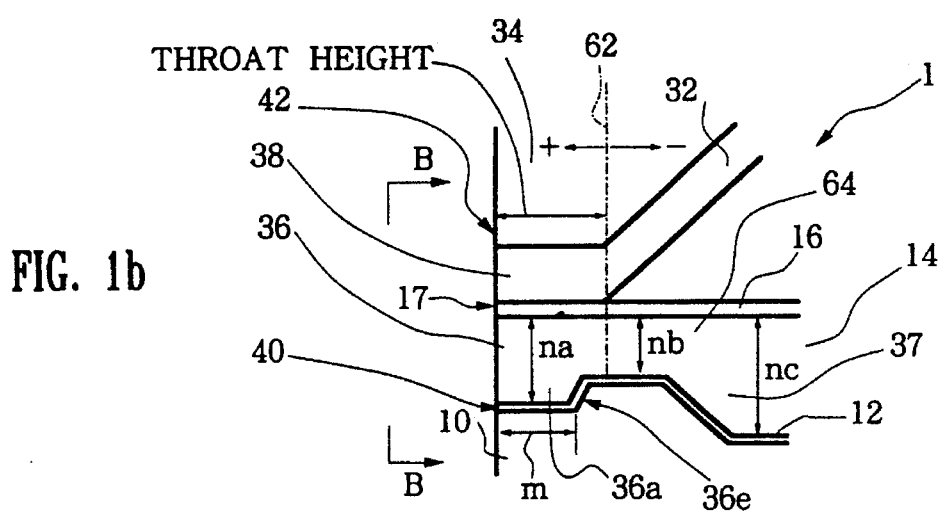
Figure 1C:
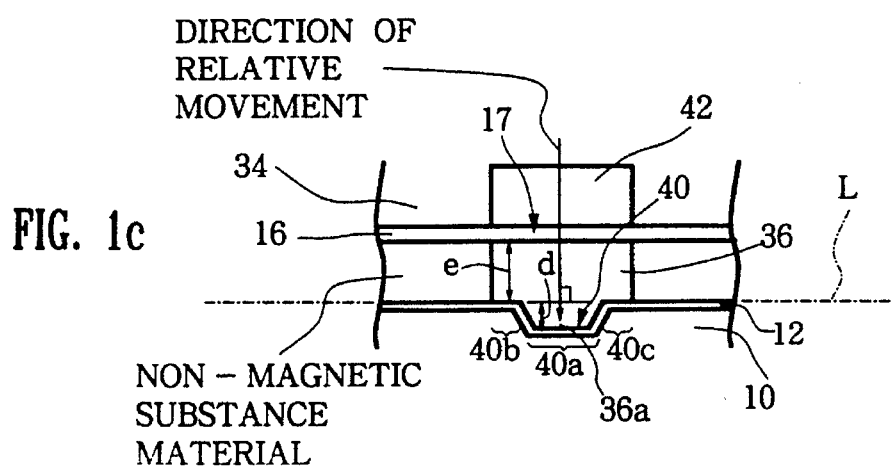
Figure 2A:
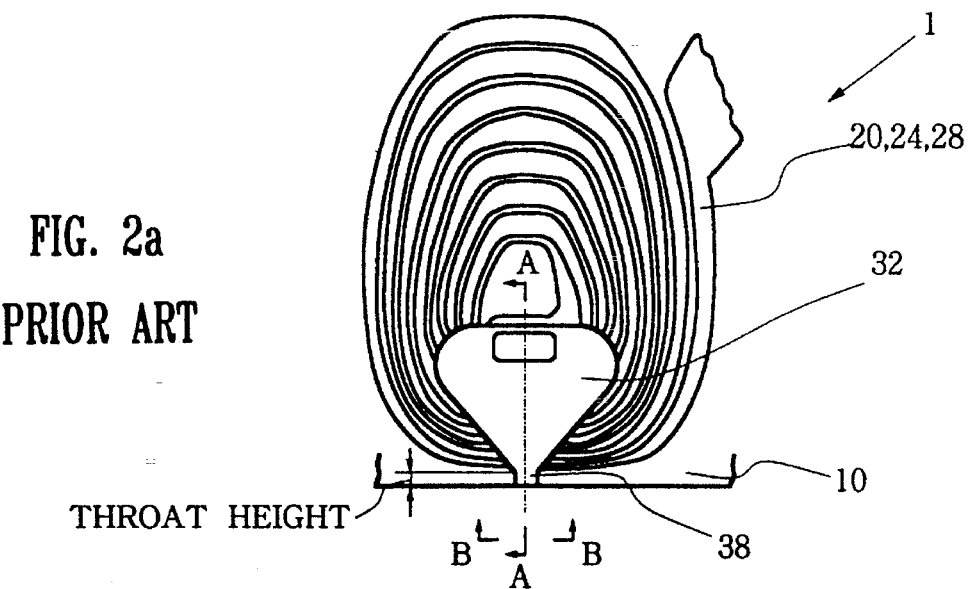
Figure 2B:
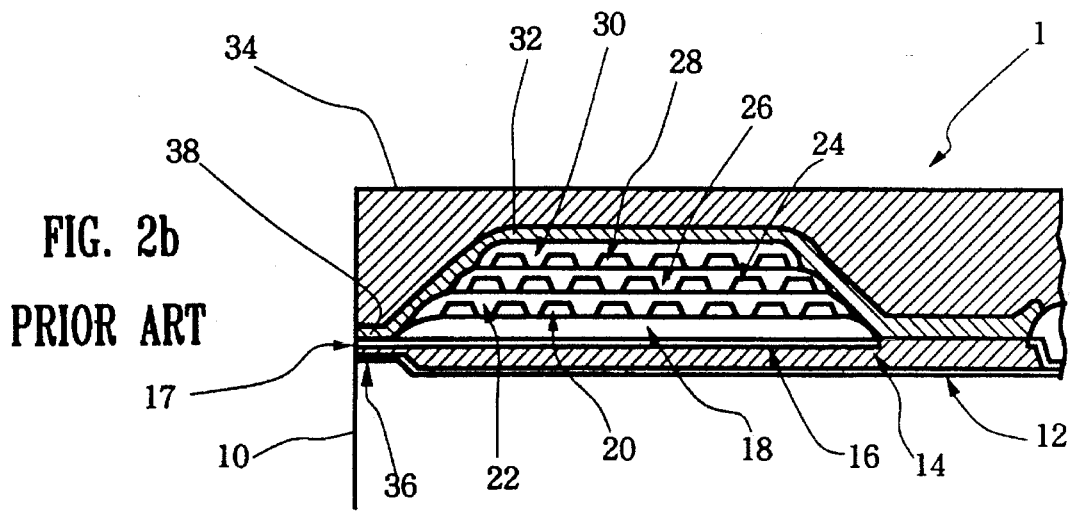
Figure 2C:
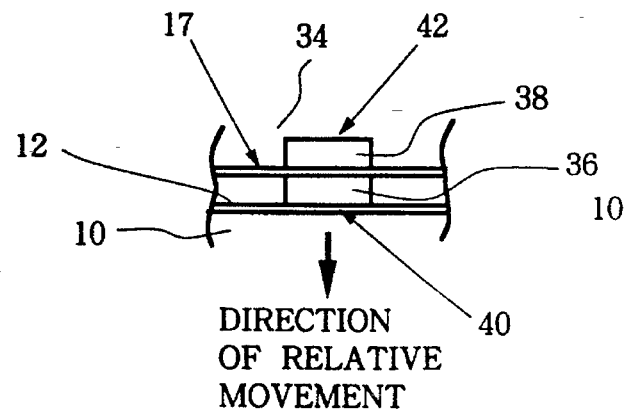
Figure 3:
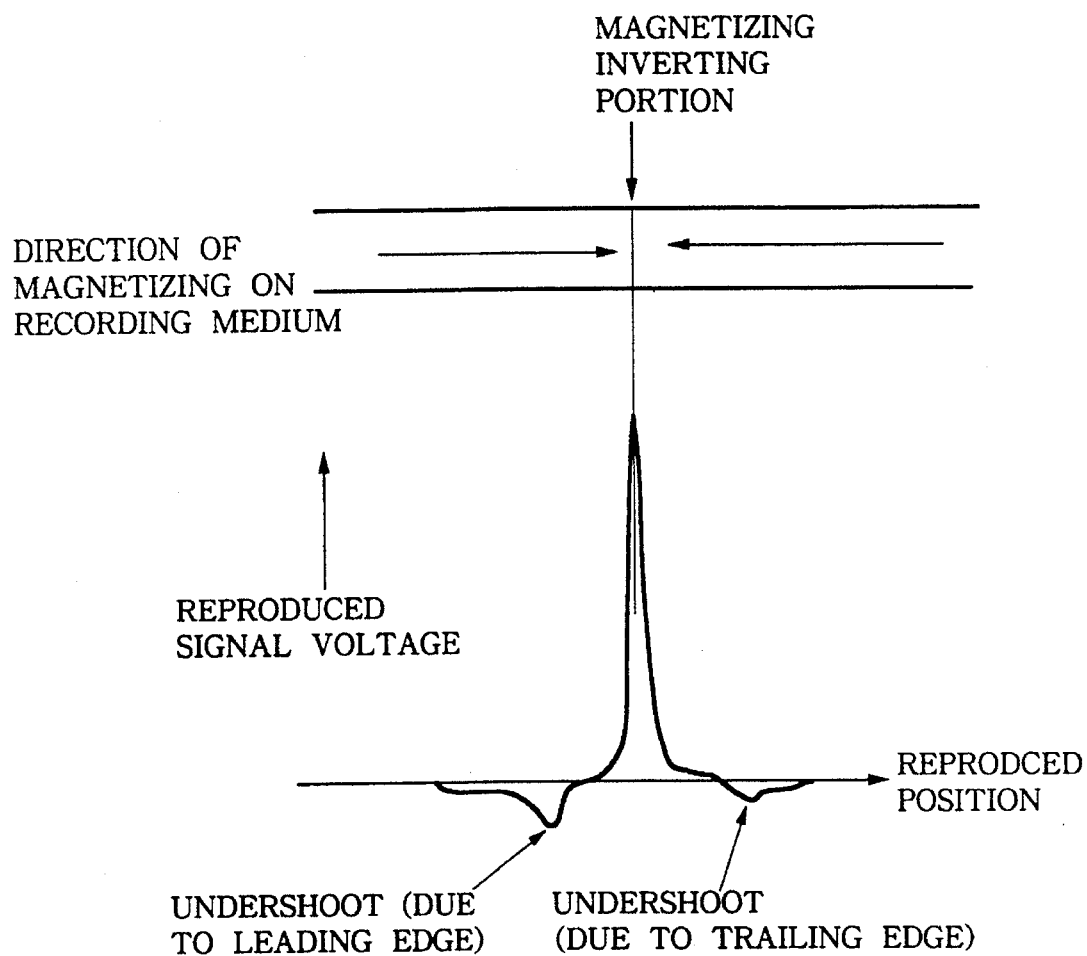
FIG. 3 is a graph showing the state of generation of undershoot in the prior art thin film magnetic head.
Figure 5:
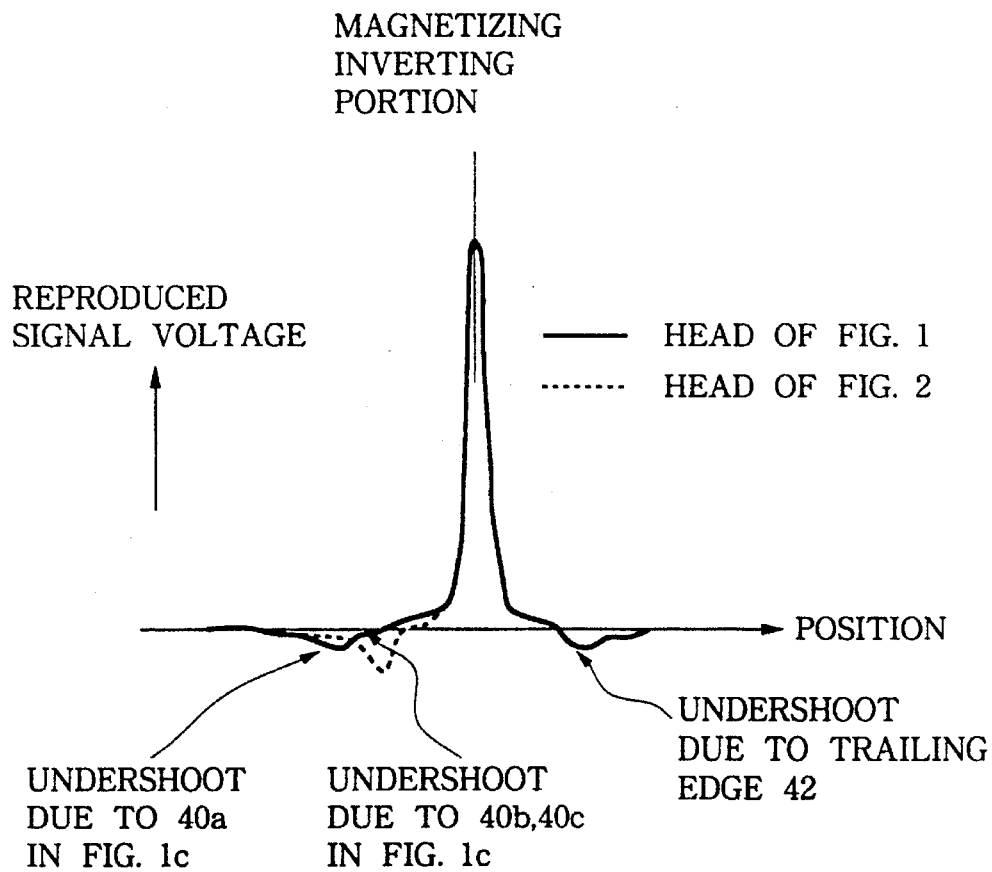
FIG. 5 is a graph showing reproduced output voltage waveforms in the magnetizing inverting portions of the thin film magnetic heads of FIGS. 1 and 2.

The structure of the portion A in FIG. 1a is shown in FIG. 1b. The shape of the exposed foremost end surface is shown in FIG. 1c as a view taken along arrows B—B in FIG. 1b. A projecting portion 36a is formed in a pole 36 (leading pole) of the lower magnetic layer 14. This projecting portion 36a extends inwardly from the central portion of the exposed foremost end surface of the pole 36. The provision of this projecting portion 36a causes a leading edge 40 to be offset from a line L normal to the direction of relative movement of the magnetic head with respect to the magnetic medium as shown in FIG. 1c (in this embodiment, in the form of a trapezoid in the central portion). According to such shape of the leading edge 40, as shown in FIG. 1c, the leading edge 40 is divided in a front portion 40a and rear portions 40b and 40c with respect to the direction of relative movement of the magnetic head to the magnetic medium and, accordingly, the leading edge 40 does not pass over the magnetizing inverting portion of the recording medium (the magnetizing inverting portion is formed in a straight line because the magnetic gap 17 is formed in a straight line) all at once during the reproduction mode as in the case of the prior art device of FIG. 2 in which the entire leading edge 40 is on a line normal to the direction of relative movement of the magnetic head with respect to the recording medium, but the leading edge 40 passes over the magnetizing inverting portion, one portion after another in a divided manner. The undershoot which is produced by the leading edge 40, therefore, is flattened as shown by a solid line in FIG. 5 and the level of a peak portion of the undershoot is held below half of that produced in the prior art magnetic head shown in FIG. 2 (shown by a dotted line in FIG. 5). Accordingly, a reading error which is caused when the peak of undershoot exceeds a threshold level is eliminated. In addition, since the pole portion has the projecting portion 36a, necessary thickness as the pole portion can be secured with a result that reluctance during reproduction can be decreased and a reproduced output can thereby be increased. The height d (FIG. 1c) of the projecting portion 36a should preferably be 0.2–3.0 μm. If the height is below 0.2 μm, the effect of reducing the undershoot cannot be sufficiently obtained whereas if the height exceeds 3.0 μm, the magnetic gradient in the magnetic gap 17 becomes gradual with resulting decrease in sharpness in the write magnetic field. The thickness e of the leading pole 36 other than the projecting portion 36a is, e.g., 1–4 μm.

Figure 6:
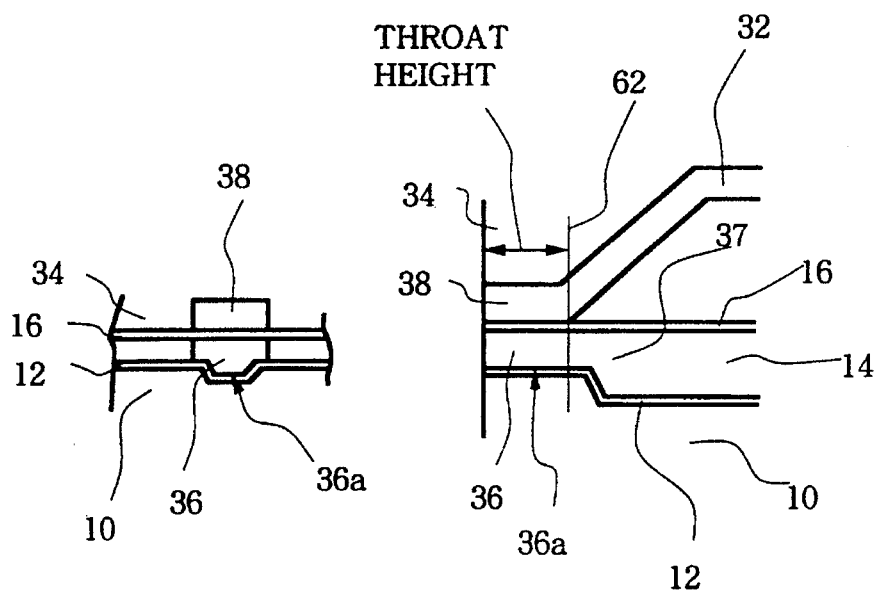
FIG. 6 is a view showing another embodiment of the invention.
Figure 7:
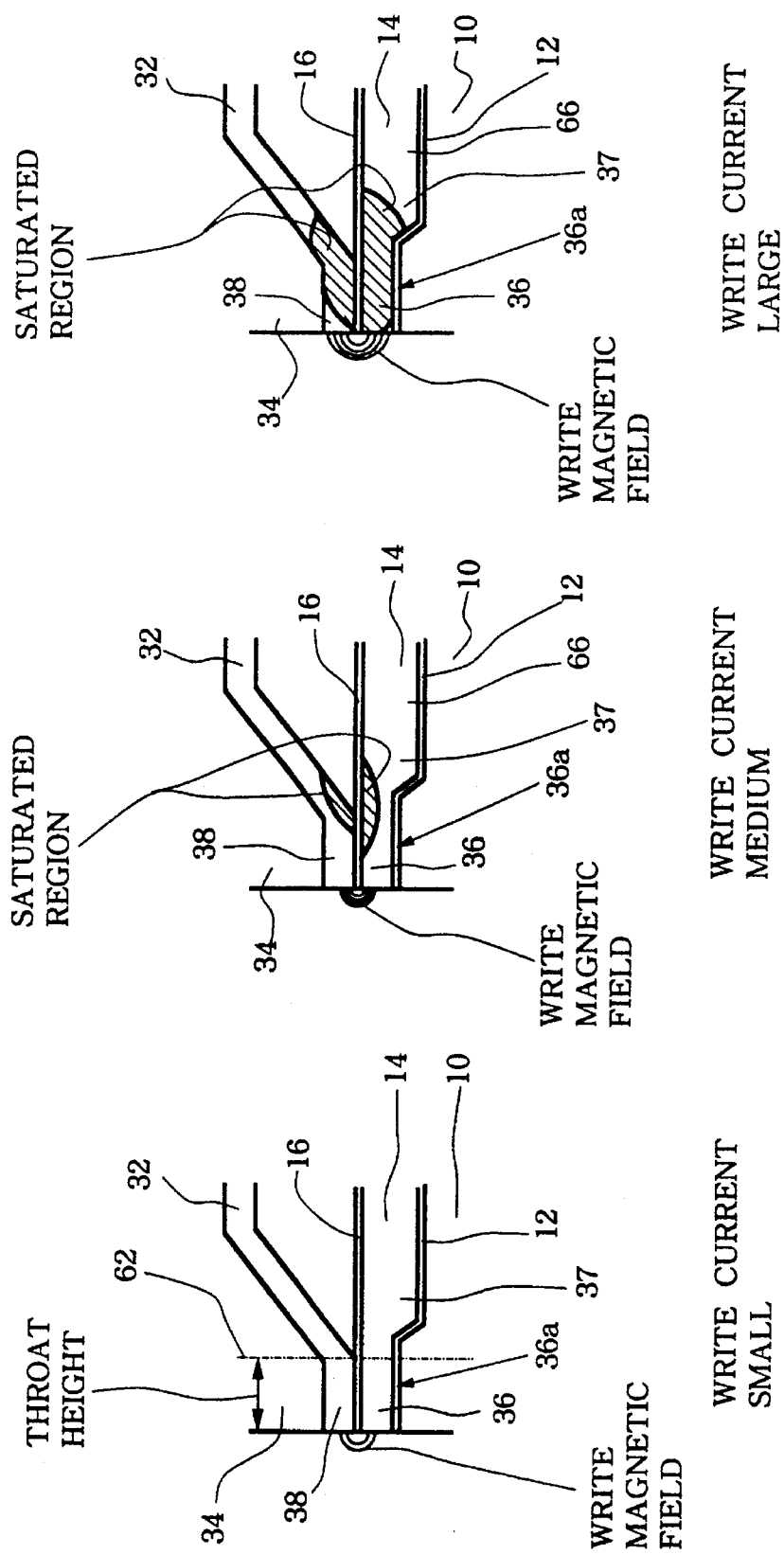
FIGS. 7a, 7b and 7c are diagrams showing relation between the write current value and magnetic saturation in a case where the rear portion of a projecting portion 36a continues to a core increased thickness portion 37 without reducing its thickness.
Figures 1, 12A:
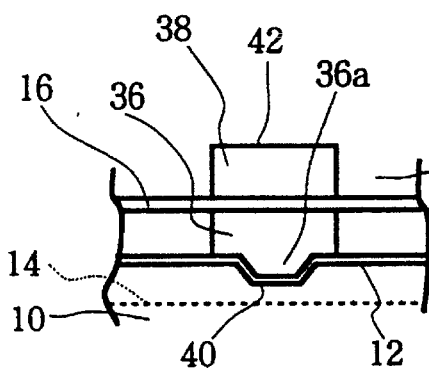
Figures 2, 12A:
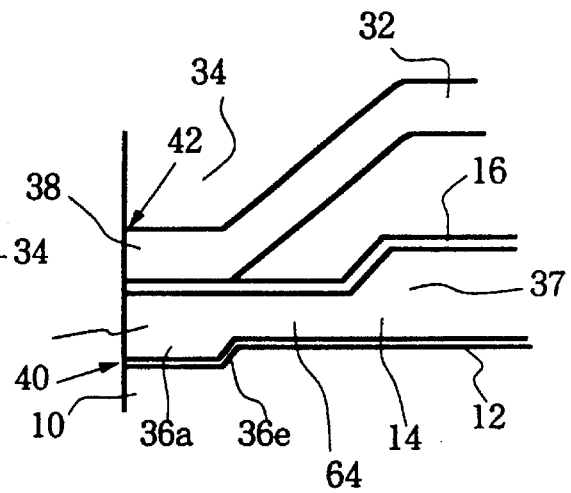

In the embodiment of FIG. 1, the rear edge 36e of the projection portion 36a is located in the vicinity of a throat height zero position 62. It is possible to extend the projecting portion 36a as in an embodiment shown in FIG. 6 to connect to the core increased thickness portion 37 in which the thickness of the lower magnetic layer 14 is increased. This arrangement however sometimes affects magnetic saturation of the pole portions 36 and 38 during recording, though the effect of preventing undershoot can be obtained regardless of the length of the projecting portion 36a. More specifically, in the case that the rear edge of the projecting portion 36a continues to the core increased thickness portion 37 without reducing the thickness of the projecting portion 36a as shown in FIG. 6, the state of magnetic saturation of the pole changes as shown in FIG. 7 depending upon the magnitude of write current during writing when the height of the projecting portion 36a is relatively large and the cross sectional area of the projecting portion 36a therefore is relatively large. The state of FIG. 7 is substantially the same as that described previously in Table 1.

Thus, in the case of the projecting portion 36a being connected to the core increased thickness portion 37 as shown in FIG. 6, the lower magnetic layer 14 becomes too thick in the vicinity of the throat height zero position 62 and, if the write current increases, magnetic saturation is produced not only in a proper part of the poles (i.e., in the vicinity of the throat height zero position 62) but broadly in the poles 36 and 38. As a result, it becomes difficult to obtain a sharp magnetic field and recording density is reduced. Therefore, phenomenon shown in FIGS. 7a and 7c are produced unless the write current is properly adjusted. It is extremely difficult to adjust the process of manufacturing and the throat height for obtaining a proper magnetic field as shown in FIG. 7b and production efficiency thereby is reduced.

By forming the rear edge 36e of the projecting portion 36a at a position in which the projecting portion 36a has not reached the core increased thickness portion as shown in FIG. 1b, a reduced thickness portion 64 having a thickness nb which is smaller than thickness nc of the core increased thickness portion 37 and thickness na of the entire leading pole 36 including the projecting portion 36a is formed whereby magnetic saturation tends to be produced only in the vicinity of a proper place (throat height zero position 62) during writing.

Figure 8:
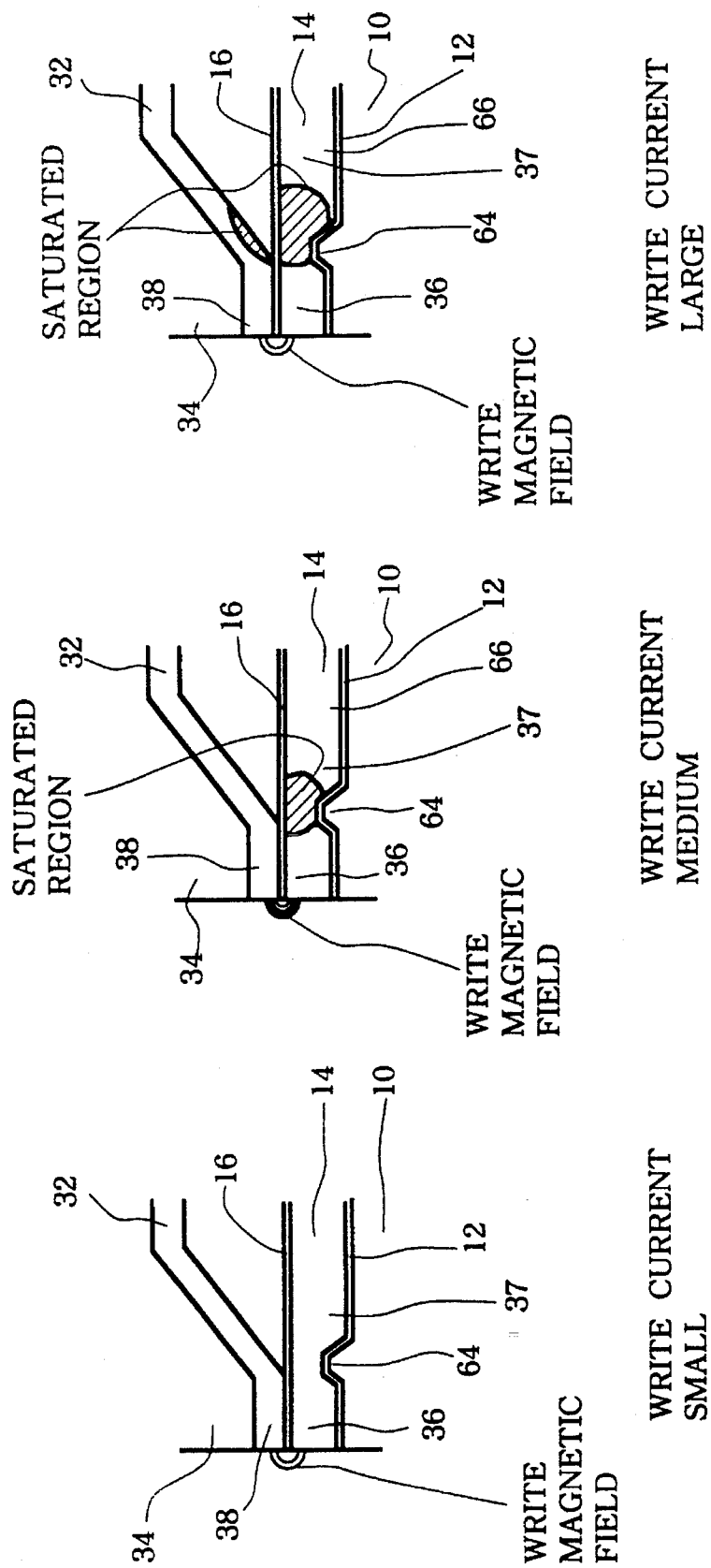
FIGS. 8a, 8b and 8c are diagrams showing relation between the write current value and magnetic saturation in the thin film magnetic head shown in FIG. 1.

The state of magnetic saturation of the pole depending upon the magnitude of the write current in the thin film magnetic head 1 of FIG. 1 is shown in FIG. 8 and described in the following Table 2.

TABLE 2

|  | FIG. 8a | FIG. 8b | FIG. 8c |
|---|---|---|---|
| write current | small | medium | large |
| magnetic saturation of pole | none | saturated in reduced thickness portion 64 but not saturated in pole 36 | saturated in reduced thickness portion 64 and a part of core increased thickness portion 37 but not saturated in pole 36 |
| write magnetic | too weak | strong and sharp magnetic field produced | strong and sharp magnetic field produced |
| density of recording | — | high | high |

When the write current is increased in the thin film magnetic head of FIG. 1, magnetic saturation is produced only in the vicinity of the throat height zero position 62 where the reduced thickness portion 14a of the lower magnetic layer 14 is located and, therefore, the total amount of flux produced in the pole portion 36 is restricted and no magnetic saturation is produced in the pole portion 36 with the result that a strong and sharp write magnetic field is obtained. The range of write current in which a strong and sharp write magnetic field can be stably obtained therefore is broad so that no strict accurateness is required in adjusting the process of manufacture and throat height whereby efficiency of production can be increased.

Figure 9:
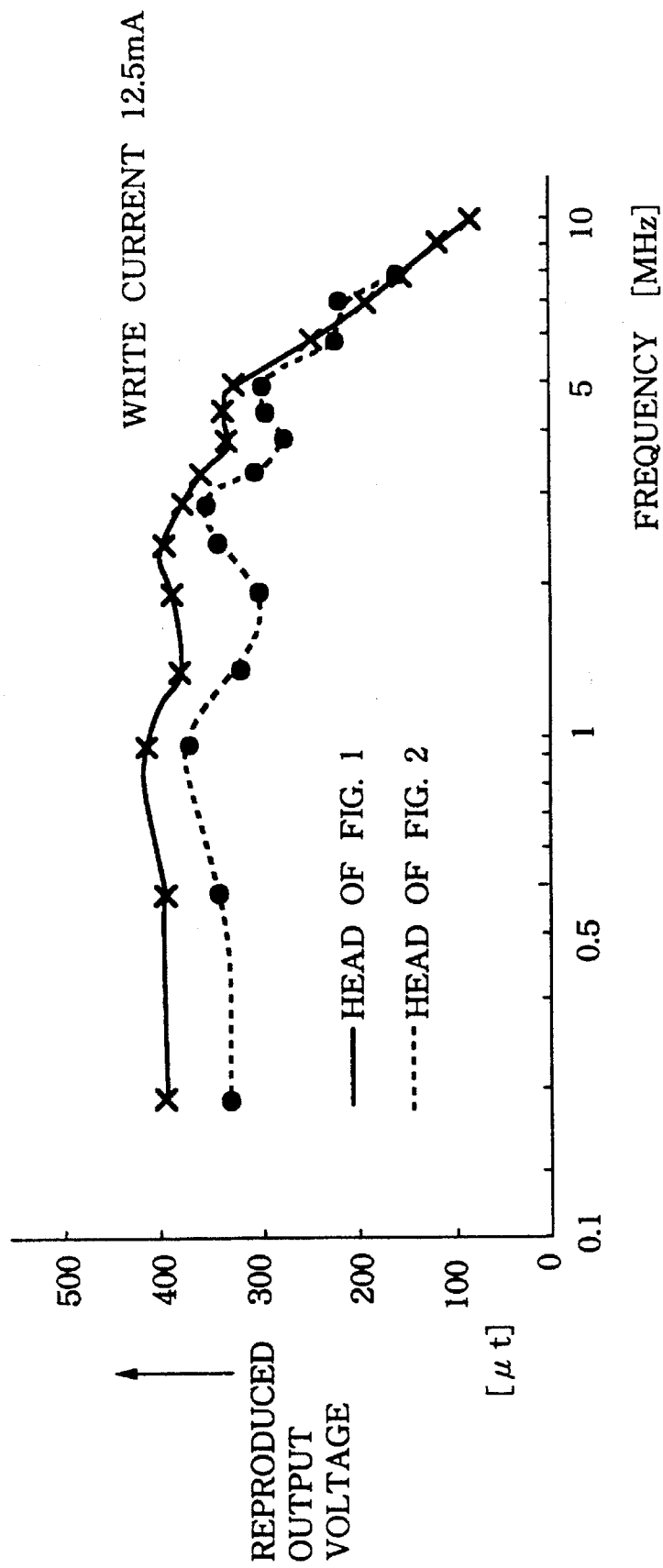
FIG. 9 is a graph showing relation between reproduced output voltage characteristics and write frequencies of the thin film magnetic heads of FIGS. 1 and 2.

FIG. 9 shows reproduced output voltage characteristics of the thin film magnetic head of FIG. 1 and those of the prior art thin film magnetic head of FIG. 2 with the write frequency being varied at a write current of 12.5 mA. According to this figure, the thin film magnetic head of FIG. 1 which has a larger thickness due to the provision of the projection portion 36a has a smaller reluctance and a higher reproduced output. Moreover, in the prior art thin film magnetic head, wavelength decreases as the frequency increases and the undershoot is overlapped with the adjacent main peak whereby the reproduced signal increases or decreases in appearance and, therefore, undulation is produced depending upon the frequency. In contrast, in the thin film magnetic field of FIG. 1, undershoot is reduced and, therefore, undulation in the reproduced output is reduced.

in FIG. 1c, the rear edge 36e of the projecting portion 36a should preferably be located within a range between a positive side position which is very near the exposed foremost end surface (the throat height zero is normally about from 0.5 to 5 μm) and a negative side position which is not in contact with the core increased thickness portion 37 and within a range up to minus 20 μm from the throat height zero position.

An example of method of manufacturing the thin film magnetic head of FIG. 1 will be described with reference to FIGS. 10a-1 to 10e-2.

Figure 11A:
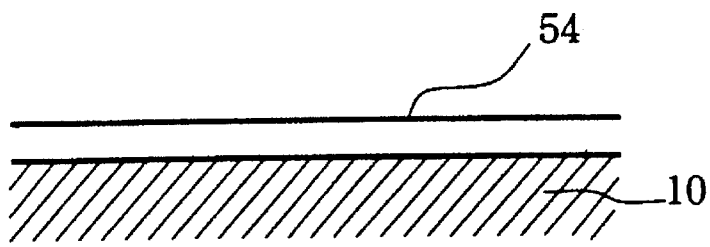
FIGS. 11a to 11e are diagrams showing an example of process of forming a recess 52 in FIG. 10a–l and 10a–z.
Figure 11B:
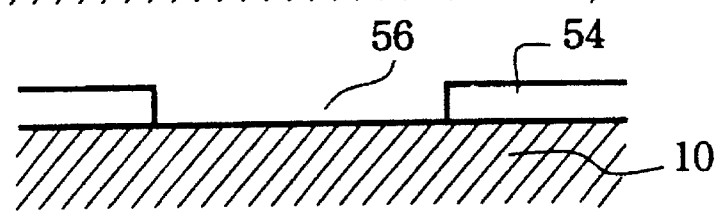
Figure 11C:
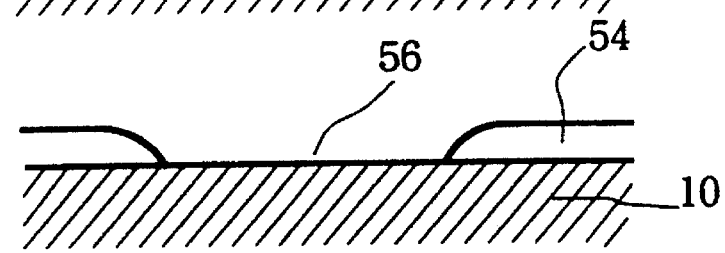
Figure 11D:
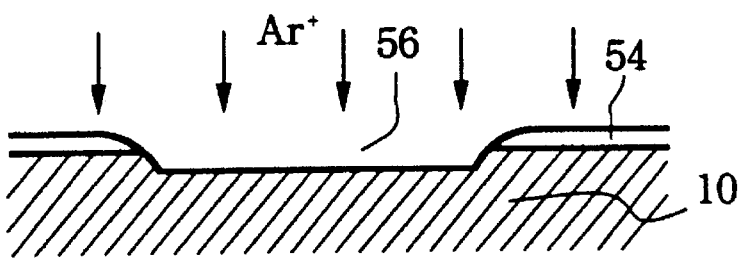
Figure 11E:
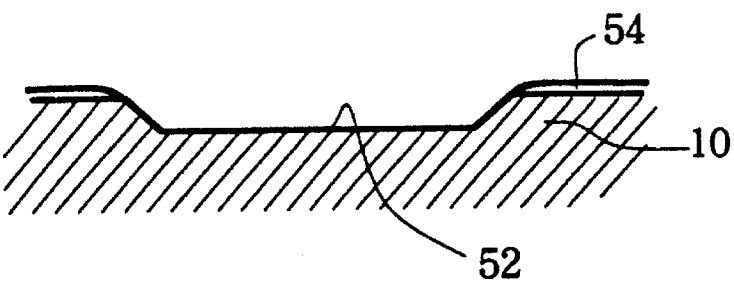

In FIGS. 10a-1, 10a-2, a recess 52 for forming the projecting portion 36a of the leading pole 36 is formed on the surface of the ground substrate 10. This recess is formed in a manner which is shown, for example, in FIGS. 11a to 11e. That is, a photo-resist 54 is coated on the substrate 10 (FIG. 11a), a pattern 56 for the recess 52 if formed by photolithography, (FIG. 11b), reflow is made (FIG. 11c), the portion of the substrate 10 exposed in the pattern 52 is removed by ion etching (FIG. 11d) and the recess is thereby formed (FIG. 11e). A recess 55 is formed in the same way.

In FIGS. 10b-1, 10b-2, the protective layer 12 is formed and thereupon is formed the lower magnetic layer 14 by electroplating permalloy or the like material.

In FIGS. 10c-1, 10c-2, the protective layer 12 and the lower magnetic layer 14 are covered with a non-magnetic substance 56.

In FIGS. 10d-1, 10d-2, the lower magnetic layer 14 is formed with a predetermined thickness by grinding.

In FIGS. 10e-1, 10e, the magnetic gap layer 16 is formed and the coil layers and insulating layers of the respective stages are formed and the upper magnetic layer 32 is further formed. Lastly, the protective layer 34 is formed. The composite layers are completed by cutting and grinding them to a predetermined position 60. Thus, a thin film magnetic head formed with the projecting portion 36a at the foremost end portion of the leading pole 36 is provided.

Figures 1, 12B:
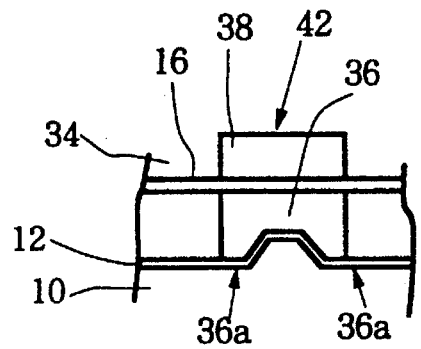
Figures 2, 12B:
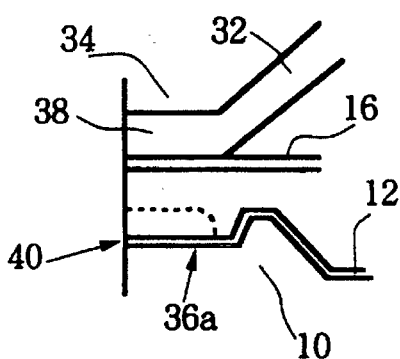
Figures 1, 12C:
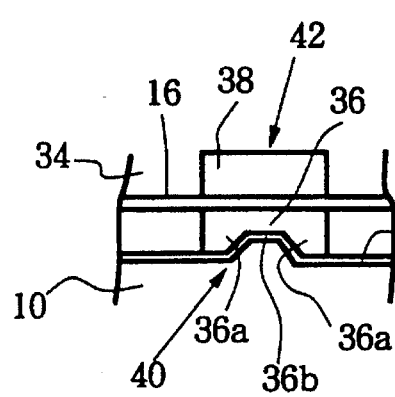
Figures 2, 12C:
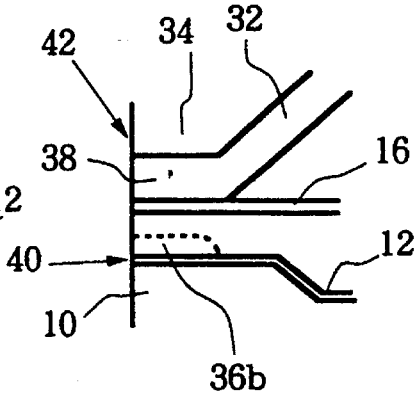

In the embodiment of FIG. 1, the lower magnetic layer 14 includes the core increased thickness portion 37 which projects downwardly. The invention can be applied also to a lower magnetic layer which has a core increased thickness portion 37 projecting upwardly as shown in FIGS. 12a-1 to 12a-2. In this case, the rear edge 36e of the projecting portion 36a is located at a position which is away from the core increased thickness portion 37 whereby a reduced thickness portion 64 is formed. The position of the projecting portion 36a is not limited to the central portion of the edge but, as shown in FIGS. 12b-1, 12b-2, two projecting portions 36a, 36a may be formed on the side portions of the edge, Alternatively, as shown in FIGS. 12c-1 to 12c-2, projecting portions 36a, 36a may be formed by forming a recess 36b in the central portion of the pole 36.

Figures 13A, 13B, 13C, 13D:
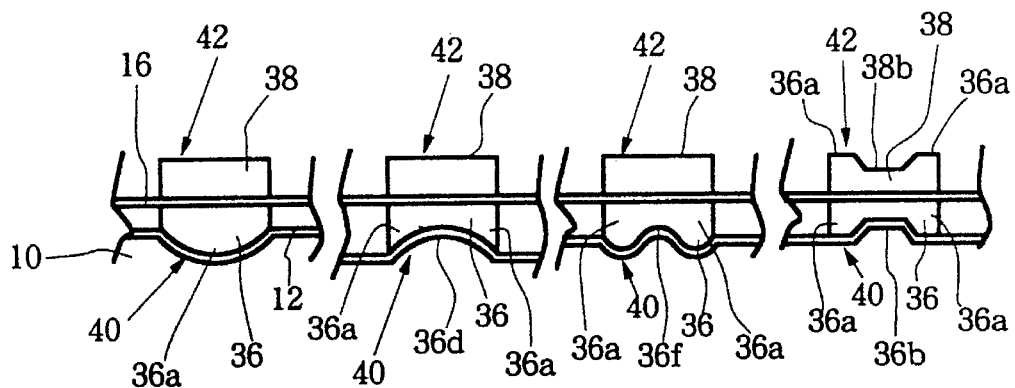
FIGS. 13a to 13g are diagrams showing still other embodiments of the invention.
Figures 13E, 13F, 13G:
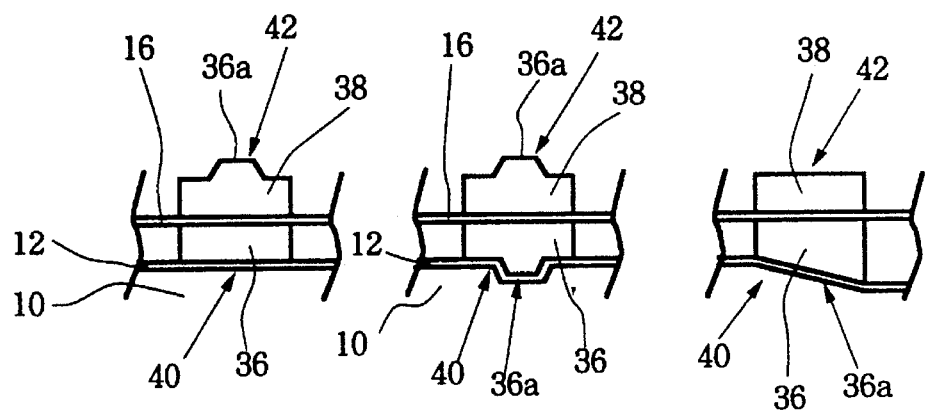

Further, the projecting portion may be formed in various shapes as shown in FIGS. 13a to 13 g. FIG. 13a shows a projecting portion 36a of an arcuate surface. FIG. 13b shows projecting portions 36a, 36a formed on both sides of an arcuate recess 36d. FIG. 13c shows an undulating portion f formed with two projecting portions 36a, 36a formed on both sides of the pole. FIG. 13d shows recesses 36b to 38b formed in the trailing edge 42 and the leading edge 40 with projecting portions 36a on both sides of the pole. FIG. 13e shows a projecting portion 36a provided only on the trailing edge 42. Projecting portions may be formed also by forming a recess on the trailing edge 42. FIG. 13f shows projecting portions 36a, 36a formed both on the trailing edge 42 and the leading edge 40. FIG. 13g shows a projecting portion 36a which is substantially of a triangular shape.

Another embodiment of the invention will now be described with references to FIGS. 14a to 14 c. In this embodiment, the invention is applied to the leading edge. In FIG. 14, the same or like component parts as those shown in FIG. 1 are designated by the same reference characters. The general structure of the substrate 10, protecting layers 12 and 34, lower and upper magnetic layers 14 and 32, coil layers and insulating layers of respective stages and magnetic gap layer 16 of the thin film magnetic head of FIG. 14 is the same as that of FIG. 1.

Figure 14A:
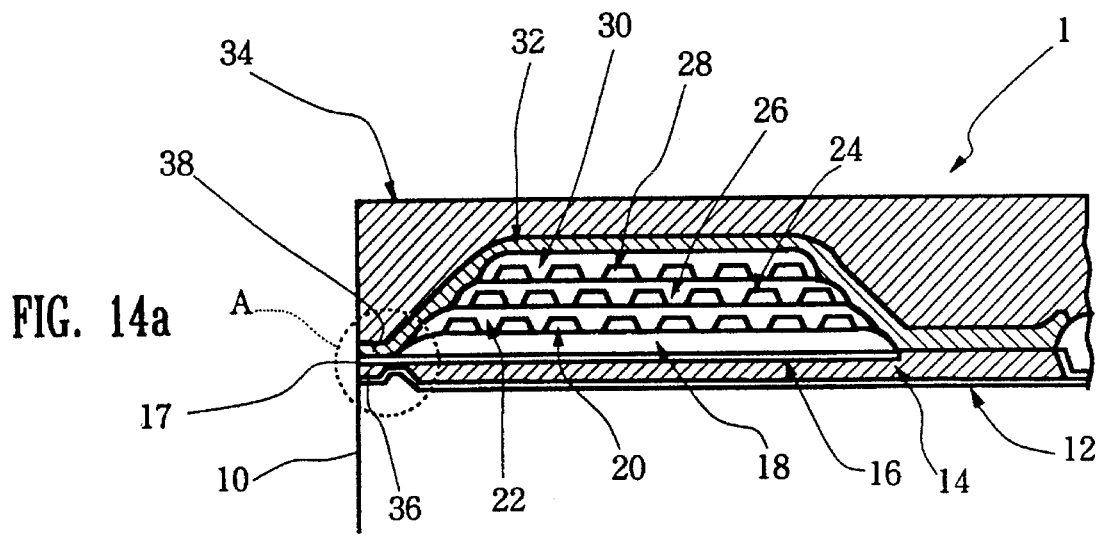
Figure 14B:
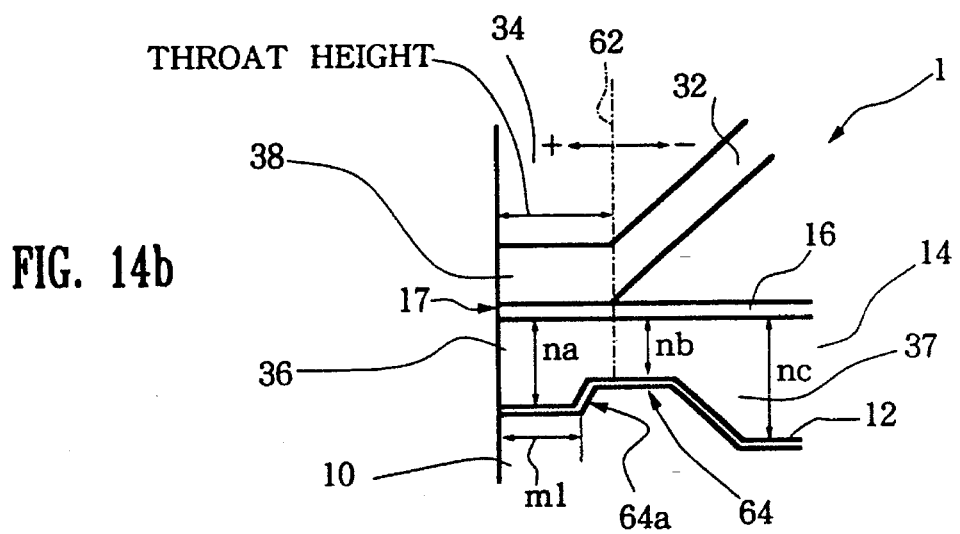
Figure 14C:
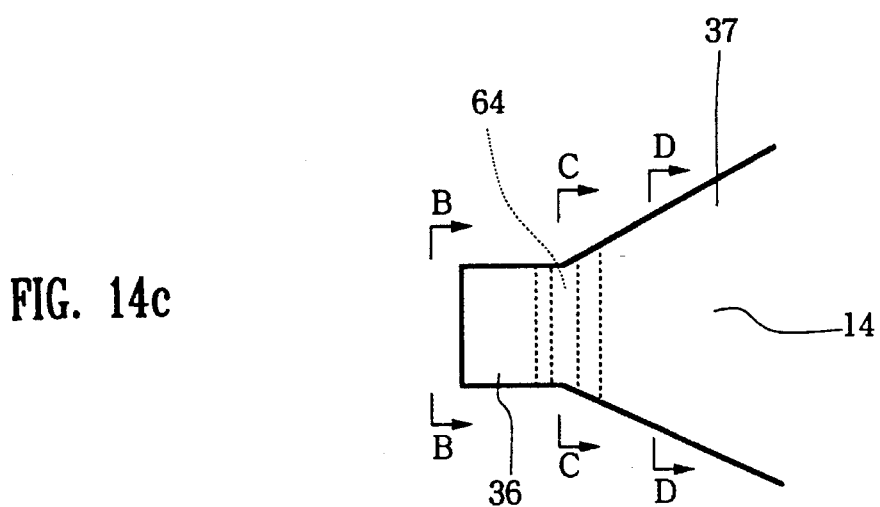
Figures 15A, 15B, 15C:
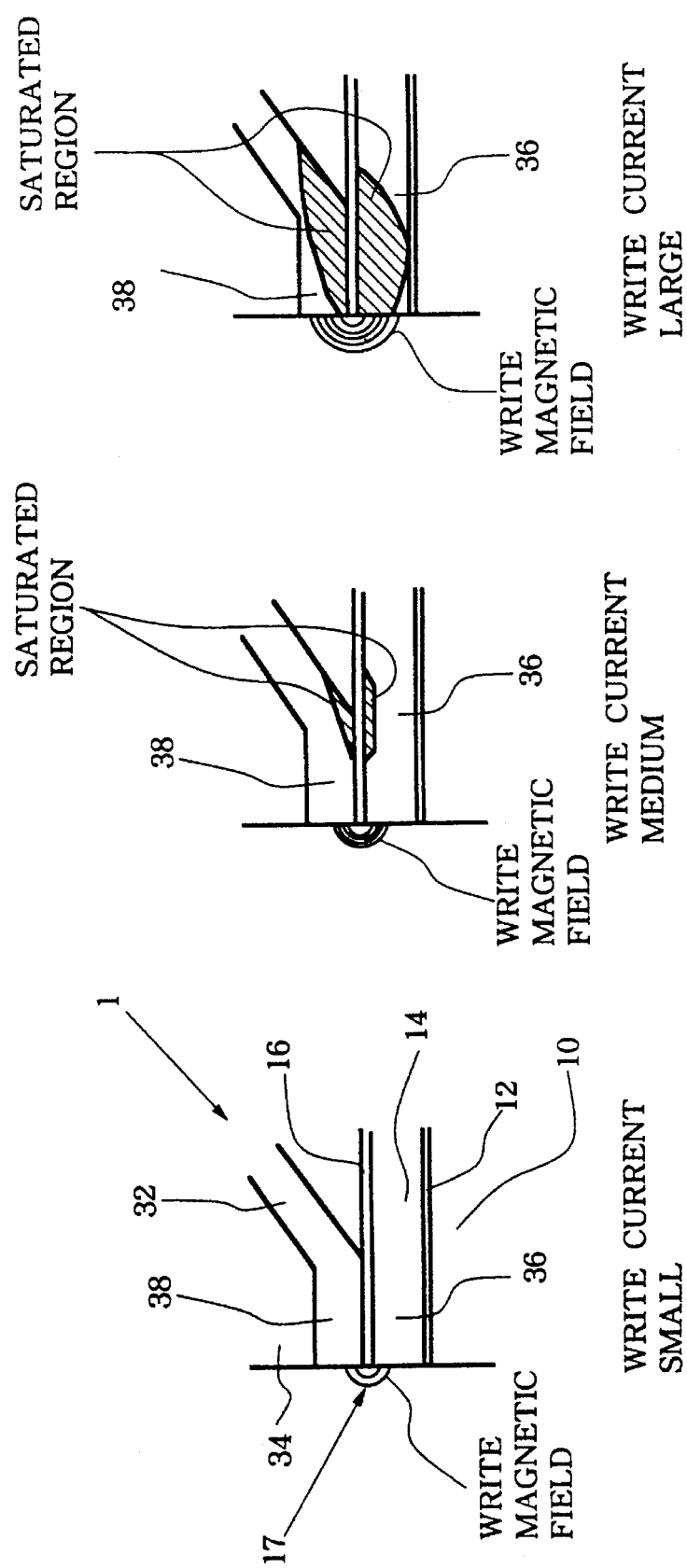
FIGS. 15a, 15b and 15c are diagrams showing relation between the wirte current value and magnetic saturation of the prior art thin film magnetic head shown in FIG. 2.
Figures 16A, 16B, 16C:
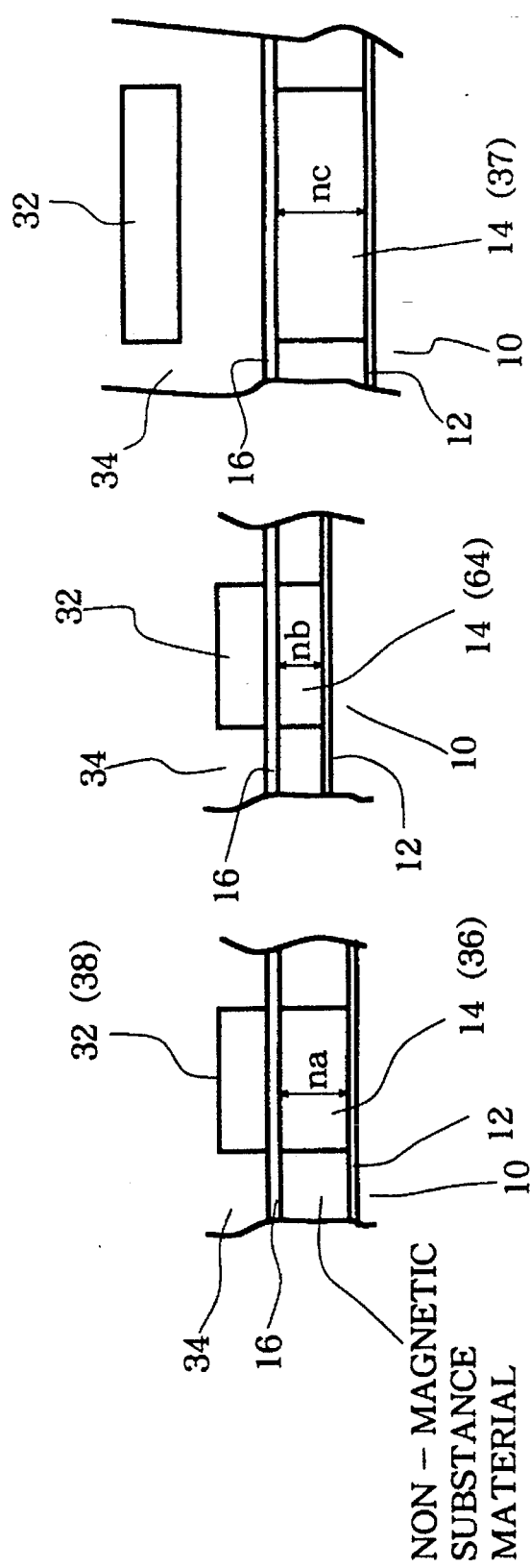
FIGS. 16a, 16b and 16c are views taken along arrows B—B, C—C and D—D in FIG. 14c.

The portion A of the FIG. 14a is shown in an enlarged scale in FIG. 14b. A plan view of the lower magnetic layer 14 is shown in FIG 14c. This thin film magnetic head 1 is formed with a reduced thickness portion 64 at the throat height zero position 62 or in the vicinity thereof in the lower surface of the lower magnetic layer 14. The thickness of the reduced thickness portion 64 is smaller than the thickness of a pole portion 36 of the lower magnetic portion 14 and the thickness of a portion of the lower magnetic layer 14 having the largest thickness (in this embodiment, a core increased thickness portion 37 in which the lower magnetic layer 14 is formed with a large thickness). FIGS. 16a, 16b and 16c show a view of pole portions 36 and 38 taken along arrows B—B in FIG. 14c, a view of the reduced thickness portion 64 taken along arrows C—C in FIG. 14c and a view of the core increased thickness portion 37 taken along arrows D—D in FIG. 14c respectively. Assuming that the pole 36 has a thickness of na, the reduced thickness portion 64 a thickness of nb and the core increased thickness portion 37 a thickness of nc, there are established relations na > nb and nc > nb. Relative magnitude of na and nc may be determined as desired. Speaking generally, nc is made large so as to reduce reluctance of the entire core so that na tends to be smaller than nc.

The state of magnetic saturation of the pole depending upon the magnitude of write current is substantially the same as that shown in FIGS. 8a, 8b and 8c and described in the above Table 2.

According to the thin film magnetic head 1 of FIG. 14, even when the write current is increased and magnetic saturation is produced in the thickness portion 64 and a part of the core increased thickness portion 37, the total amount of flux produced in the pole portion 36 is restricted in the reduced thickness portion and no magnetic saturation is produced in the pole portion 36 with the result that a strong and sharp write magnetic field is obtained. The range of write current in which a strong and sharp write magnetic field can be stably obtained therefore is broad so that no strict accurateness is required in adjusting the process of manufacture and throat height whereby efficiency of production can be increased.

Thicknesses of the reduced thickness portion 64 and the pole portion 36 can be selected in various manners. For example, the pole 36 may be the same as the pole of the prior art magnetic head and the reduced thickness portion may be formed with a smaller thickness or, conversely, the reduced thickness portion 64 may be formed with a thickness which is the same as the thickness of the pole of the prior art magnetic head and the pole 36 may be formed with a larger thickness than the pole of the prior art magnetic head. The latter arrangement causes reluctance in the pole to be decreased with resulting increase in the reproduced output. If the pole 36 is too thick, however, magnetic gradient in the magnetic gap becomes gradual and write magnetic field loses its sharpness so that a proper thickness should be selected.

In FIG. 14b, it is preferable for magnetic saturation at a proper position (in the vicinity of throat height zero position) to determine the position of the front edge 64a of the reduced thickness portion 64 within a range between a positive side position which is very near the exposed foremost end surface (throat height is normally about 0.5–5 μm) and a negative side position which is away from the core increased thickness portion 37 and within a range up to −20 μm. More preferably, the front edge 64a of the reduced thickness portion 64 is located in the range which is larger than minus 20 μm from the throat height zero position. Further, the rear edge of the reduced thickness portion 64 is located in the range between zero to minus 20 μm from the throat height zero position. In addition, ml, which represents a distance between the exposed foremost end and the front edge 64a of the reduced thickness portion 64 surface is larger than 1 μm.

An example of a process of manufacturing the thin film magnetic of FIG. 14 is shown in FIGS. 17a-1 to 17e-2.

In FIGS. 17a-1, 17a-2, a recess 55 for forming a core side portion 66 of the lower magnetic layer 14 and a projection 57 for forming the reduced thickness portion 64 are formed on the surface of the ground substrate 10.

In FIGS. 17b-1, 17b-2, the layer 12 is formed and thereupon is formed the lower magnetic layer 14 by electroplating permalloy or the like material.

In FIGS. 17c-1, 17c-2, the protective layer 12 and lower magnetic layer 14 are covered with a non-magnetic substance 56.

In FIGS. 17d-1, 17d-2, the lower magnetic layer is formed with a predetermined thickness by grinding.

In FIGS. 17e-1, 17e-2, the magnetic gap layer 16 is formed and the coil layers and insulating layers of the respective stages are formed and the upper magnetic layer 32 is further formed. Lastly, the protective layer 34 is formed. The composite layers are completed by cutting and grinding them to a predetermined position 60. Thus, a thin film magnetic head formed with the projecting portion 36a at the foremost end of the leading pole 36 is provided.

Another embodiment of the invention is shown in FIGS. 18a, 18b, 18c and 18d. In this embodiment, the core increased thickness portion 37 of the lower magnetic 14 has a cross sectional shape projecting upwardly. in this embodiment, the reduced thickness portion 64 is formed in such a manner that the front edge 64a thereof is away from the core increased thickness portion 37. Sectional views taken along arrows A—A, B—B and C—C in FIG. 18a are shown as FIGS. 18b, 18c and 18d. In this embodiment, assuming that the thickness of the pole 36 is na, the thickness of the reduced thickness portion 64 nb and the thickness of the remaining portion nc, relations na > nb and nc > nb are established. The embodiment of FIG. 18 operates in the sane manner as the embodiment of FIG. 14 and a strong and sharp write magnetic field can be obtained over a broad range of write current values.

What is claimed is:

1. A thin film magnetic head comprising:

a gap layer;

a first magnetic layer having a first pole portion and a first side along which the first magnetic layer is in contact with the gap layer, wherein a write magnetic field is generated in a region adjacent the first pole portion of the first magnetic layer;

a second magnetic layer having a core portion and a second pole portion having first and second sides, the second magnetic layer contacting the gap layer at least on the first side of the second pole portion opposite and separated from the first pole portion by the gap layer, the second side of the second pole portion having:

a projecting portion defined on the second side of the second pole portion and extending away from the second side of the second pole portion, and an indentation defined as a locally reduced thickness area in the second pole portion, the indentation being disposed opposite and adjacent a portion of the gap layer which is in contact with both the first side of the first magnetic layer and the first side of the second pole portion;

at least one conduction coil provided between the first and the second magnetic layer; and at least one non-magnetic insulating layer provided between the first and the second magnetic layer for protecting the at least one conduction coil.

2. A thin film magnetic head as defined in claim 1 wherein the projecting portion forms a cross-section having the shape of a trapezoid.

3. A thin film magnetic head as defined in claim 1 wherein the projecting portion defines two longitudinally separated projections.

4. A thin film magnetic head as defined in claim 1 wherein the projecting portion protrudes from the second side of the second magnetic layer in an arcuate shape.

5. A thin film magnetic head as defined in claim 1 wherein the cross-section of the indentation in the second magnetic layer is in the shape of a convex.

6. A thin film magnetic head as defined in claim 1 wherein the projecting portion defines a cross-section having a wavy shape with two projections formed on opposite sides of the second pole portion.

7. A thin film magnetic head as defined in claim 1 wherein the projecting portion protrudes from the second magnetic layer in a substantially triangular shape.

8. A thin film magnetic head as defined in claim 1 wherein the projecting portion and the core portion extend beyond and away from the indentation.

9. A thin film magnetic head as defined in claim 1 wherein the projecting portion is thinner than the core portion.

10. A thin film magnetic head as defined in claim 1 wherein the projecting portion is thicker than the core portion.

11. A thin film magnetic head comprising:

a first magnetic layer having a first pole portion and a first core portion;

a second magnetic layer having a second pole portion and a second core portion, wherein the first pole portion and the second pole portion define a gap region between a first surface of the first magnetic layer and a second surface of the second magnetic layer in which the first surface and the second surface are parallel, the gap region being disposed so that a write magnetic field is generated adjacent the gap region;

an indentation defined as a locally reduced thickness area in at least one of the first and the second pole portions, the locally reduced thickness area being provided in a pole portion adjacent to or within the gap region so that the indentation has a thickness which is less than the thickness of the rest of the pole portion and less than the thickness of the core portion;

a gap layer separating the first magnetic layer and the second magnetic layer;

one or more conduction coils provided between the gap layer and the first magnetic layer;

one or more non-magnetic insulating layers provided between the gap layer and the first magnetic layer for protecting the conduction coils; and a projecting portion having a first edge and a second edge formed on a surface of at least one of the first or second pole portions of the first and second magnetic layers, respectively, the projecting portion protruding longitudinally from the surface of an associated pole portion;

wherein the indentation separates the rear edge of the projecting portion from an associated core portion which is thicker than the projecting portion.

12. A thin film magnetic head as defined in claim 11 wherein said projecting portion is formed in the pole portion of the second magnetic layer and said second core portion projects beyond the thickness of the projecting portion.

13. A thin film magnetic head as defined in claim 11 wherein said projecting portion is formed in the second pole portion of the second magnetic layer and said core portion is thinner than the projecting portion.

14. In a thin film magnetic head having a laminated structure comprised of a first magnetic layer having a core portion with a first thickness and a first pole portion with a second thickness, a second magnetic layer with a second pole portion so that the first pole portion and the second pole portion define a gap region in which a first surface of the first magnetic layer faces on a second surface of the second magnetic layer so that the first surface and the second surface are parallel and so that a write magnetic field may be generated adjacent the gap region, multi-level induction coils for forming magnetic flux, and interlevel insulating layers inserted between said multi-level induction coils, the improvement comprising a depression locally provided in the first magnetic layer at a position within the first pole portion and opposite the gap region, a thickness of the magnetic layer at the position of the depression being less than the first and the second thicknesses.

15. A thin film magnetic head comprising:

a first magnetic layer having a first pole portion disposed adjacent a region in which a write magnetic field is generated;

a gap layer contacting the first magnetic layer on a first side of the first pole portion, wherein a throat height zero position is defined at an inside edge of the area of contact between the gap layer and the first side of the first pole portion;

a second magnetic layer having first and second sides, a second pole portion, and a core portion, the second magnetic layer contacting the gap layer at least on the first side of the second pole portion opposite and separated from the first side of the first pole portion by the gap layer, the second side having:

a projecting portion having thickness in the range of 0.2–3.0 μm, and an indentation defined as a locally reduced thickness area in the second magnetic layer, the indentation being located in the vicinity of the throat height zero position;

at least one conduction coil provided between the first and the second magnetic layer; and at least one non-magnetic insulating layer provided between the first and the second magnetic layer for protecting the at least one conduction coil.

16. A thin film magnetic head comprising:

a first magnetic layer having a first pole portion with a first thickness, a first core portion with a second thickness, and a depression formed therein having a thickness which is less than the first and second thicknesses;

a second magnetic layer having a second pole portion and a second core portion;

a gap layer formed between the first and second magnetic layers, the gap layer contacting both the first and the second magnetic layers at the first and second pole portions, wherein the depression in the first magnetic layer is disposed adjacent a portion of the gap layer which is in contact with both the first and second magnetic layers thereby causing magnetic saturation in the first magnetic layer to be isolated near the depression in the first magnetic layer; and a laminated structure comprising a plurality of coils and an insulating layer, the laminated structure being formed between the gap layer and the second magnetic layer.

17. A thin film magnetic head according to claim 16, further comprising a projecting portion on the first pole portion of the first magnetic layer.

18. A thin film magnetic head according to claim 17, wherein the projecting portion forms a cross-section of trapezoidal shape.

19. A thin film magnetic head according to claim 17, wherein the projecting portion defines two longitudinally separated projections.

20. A thin film magnetic head according to claim 17, wherein the projecting portion protrudes from a bottom side of the first magnetic layer in an arcuate shape.

21. A thin film magnetic head according to claim 17, wherein the projecting portion defines a wavy cross-sectional shape with two projections formed on opposite sides of the first pole portion.

22. A thin film magnetic head according to claim 17, wherein the projecting portion protrudes from the first magnetic layer in a substantially triangular shape.

23. A thin film magnetic head according to claim 16, wherein the depression has a convex cross-sectional shape.

* * * * *